2,921,846
Patented Jan. 19, 1960

2,921,846

THICKENED OR GELLED NORMALLY LIQUID NITROPARAFFIN PROPELLANTS

Leo J. Novak, Dayton, Ohio, assignor, by mesne assignments, to Midland Chemical Corporation, Dayton, Ohio, a corporation of Delaware No Drawing. Application February 11, 1955
Serial No. 487,700

8 Claims. (Cl. 52—.5)

This invention relates to gelled or thickened normally liquid nitroparaffins.

As is known, the liquid nitroparaffins like nitromethane and nitroethane have been used as propellants in jet propulsion devices, and also in explosives. For some purposes, instead of using the nitroparaffins in their normal liquid state, gels or thickened semisolid forms are more desirable. This has been recognized, but considerable difficulty has been experienced in converting the liquid materials to the gel or semisolid state without unfavorably altering the oxygen balance thereof and other characteristics.

The addition of nitrocellulose to the nitroparaffins has a gelling action thereon and the gels are stable for some time. However, nitrocellulose does not present any wide choice in predetermining the characteristics of the gels, except as may be achieved by varying the relative proportions of the nitroparaffin and nitrocellulose. As is known, in order to obtain a solid gel using nitrocellulose as the gelling agent, the nitrocellulose must be used in amounts as high as 50% by weight.

An object of this invention is to provide new gelling or thickening agents for the liquid nitroparaffins which may be selected on the basis of the constitution thereof to exert a predetermined thickening or gelling action on the nitroparaffins so that, where gels or very thick products are desired, these may be obtained without requiring very large amount of the gelling agents.

In accordance with the invention, the normally liquid nitroparaffins are converted to gels having viscosity ranging from syrupy to solid by incorporating therewith a nitrodextran which may also contain sulfate groups.

Dextran nitrates and dextran nitrate-sulfates are new materials described in the application of Leo J. Novak et al., Serial No. 409,781, filed February 11, 1954. The dextran nitrates may be obtained by reacting on a selected dextran, in solid, particulate condition or dispersed in water, with concentrated nitric acid or with fuming nitric acid, until a highly substituted or tri-nitrate is produced. Dextran nitrate sulfates may be obtained, for example, by effecting the nitration in sulfuric acid medium.

The nitrate or nitrate-sulfate may be derived from an inherently water-soluble or substantially water-insoluble native dextran or from a dextran hydrolyzate resulting from hydrolysis of water-soluble native dextran or of water-insoluble native dextran, and, in the latter case, the hydrolyzate may or may not be water-soluble.

The water-sensitivity and other properties of the dextran are determined by the molecular structural repeating 1,6 to non-1,6 linkages ratio by the dextran, this ratio being in turn determined by the microorganism used to effect biosynthesis of the dextran from sucrose or equivalent source. The procedure is to inoculate a sucrose-bearing nutrient medium with a culture of a dextran-producing microorganism such as those of the *Leuconostoc mesenteroides* or *L. dextranicum* types, or the enzyme filtered from the culture, incubate the mass until the dextran is produced in maximum yield, precipitate the dextran from the fermentate, purify it and, for the present purposes, reduce it to particulate condition. The native dextran thus obtained has a very high molecular weight, usually calculated to be in the millions, and may be water-soluble or water-insoluble. It may be nitrated at the native molecular weight or partially hydrolyzed to a lower molecular weight. The molecular weight may be between 5000 and that of the native, microbiologically produced material.

The dextran nitrate or dextran nitrate-sulfates may be added as thickening, gelling or solidifying agent to mono- and polynitro-paraffins which are liquid at room temperature, including the mono- and poly-nitromethanes, nitroethanes, nitropropanes, nitroisopropanes, nitrobutanes, nitroisobutanes, nitropentanes, etc. More specifically, there may be used any of the liquid mono- and poly-nitroparaffins such as mononitromethane (i.e., the substance generally referred to simply as nitromethane), di-nitromethane, di-nitroethane, di-nitropropane, di-nitrobutane, and the like, or any mixture of the liquid nitroparaffins, or solutions of any of the normally solid nitroparaffins containing sufficient oxygen to sustain self-combustion. Since nitromethane is usually the nitroparaffin most generally used as propellant and explosive, it is of particular interest for admixture with a nitrodextran which thickens, gels, or solidifies it and with which the nitroparaffin forms a satisfactory self-combustible propellant gel or when thickened or gelled in combination with a sensitizer, a satisfactory explosive.

The homogeneous semi-solid or solid gels are obtained by adding the selected dextran nitrate or dextran nitrate-sulfate to the liquid nitroparaffin at room temperature or at temperatures and under pressures at which explosion of both the nitroparaffin and dextran derivative is avoided.

The dextran nitrate or nitrate-sulfate may be selected so that, in a given concentration between, say, 5% and 15%, it converts the liquid to a syrup or gel of given viscosity depending on the particular dextran derivative used. Thus, in general, dextran nitrate or dextran nitrate-sulfate derived from native water-soluble dextran in the concentrations stated converts the liquid nitroparaffin to a syrupy material, while the nitrate or nitrate-sulfate derived from water-insoluble dextrans produce the more solid gels.

The nitroparaffins and dextrans derivatives both contain oxygen in the molecule in quantity sufficient to insure complete combustion and burn completely at ambient conditions without requiring oxidizers.

The thickened or gelled nitroparaffins containing the gelling aids in accordance with this invention may be used either as explosives or as self-combustible propellants. When detonated with sufficient force, the products are explosive, but may be adapted to be burned as fuels as in jet propulsion motors without detonation. A sensitizer compatible with the other ingredients may be and usually is included in the nitroparaffin, before addition of the thickener, when the gel is to be used as an explosive. Organic amines may be used as sensitizer, including aromatic amines like aniline and diphenyl-ethylene-diamine, and aliphatic amines such as diethyl-amine, tetraethylene pentamine and the like. The sensitizer is preferred but is optional and may be omitted.

The dextran nitrates and nitrate-sulfates are especially satisfactory thickening and swelling agents for explosives since the viscosity can be adjusted by choice of the dextran derivative and without requiring use of the thickening agent in an amount that would decrease the explosive strength of the nitroparaffin. Generally, mixtures of nitroparaffin and the dextran derivative containing as little as 5% by weight of the dextran derivative can be exploded by the shock of a conventional fulminate type blasting cap and, in the absence of shock, can be confined and burned as propellant charges without exploding. The term "restricted propellant charge" as used herein has its usual meaning of a charge in which the burning occurs over a predetermined face of limited area and does not take place simultaneously over the entire outside surface of the propellant mass. The necessary confinement or restriction may be achieved by coating all surfaces except the burning surface with a liner adhesive to the propellant mass and having a slower burning rate than the material constituting the principal charge. Dextran esters and ethers, specifically dextran xanthate, are examples of adhesives which may be used as liners for confining the burning. Adhesive cellulose esters and ethers may also be used.

Catalysts may be employed to improve the burning properties of the gel propellant charge, and if used are added to the nitromethane or the like before it is mixed with the nitrodextran. The known catalysts may be used, such as chrome acetyl acetonate, known to be particularly effective in assisting easy ignition of nitromethane, and are effective in small amounts ranging from a trace up to 3% by weight of the nitromethane.

Since the dextran derivatives do not need to be used in large amounts to produce even stiff gels, a homogeneous mixture may be obtained by simply stirring the selected dextran derivative into the liquid nitroparaffin. Milling or kneading of the ingredients to insure homogeniety is not required.

Microorganisms (or their enzymes) which convert sucrose to water-soluble dextran include those bearing the following NRRL (Northern Regional Research Laboratory) designations: *Leuconostoc mesenteroides* B–512, B–119, B–1146, and B–1190. Those which result in native dextran that is inherently water-insoluble include: *Leuconostoc mesenteroides* B–523, B–742, B–1120, B–1191, B–1196, B–1208, B–1216, B–1144, and B–1384; *Betabacterium vermiforme* B–1139 and *Streptobacterium dextranicum* B–1254. The nitrodextran may have an average D.S. (degree of substitution) with respect to nitrate groups of up to about 3.0. The dextran nitrate sulfate may have an average D.S. of 0.1 to 2.0 with respect to nitrate groups and 0.1 to 2.9 with respect to sulfate groups.

The following examples are illustrative of specific embodiments of the invention, it being understood that these examples are not limitative.

*Example I*

To 95 parts of liquid nitromethane there are added at room temperature and with stirring, 5 parts of dextran trinitrate derived from *L.m.* B–512 dextran of average molecular weight 70,000. A stable, thick syrup-like fluid is obtained.

*Example II*

To 95 parts of liquid nitromethane there are added, at room temperature, and with stirring, 5 parts of dextran trinitrate derived from native *L.m.* B–523 dextran. A stiff gel is obtained which is suitable for use as a self-combustible propellant.

*Example III*

Example I is repeated except that the viscosity of the nitromethane is increased by addition of 5 parts of dextran nitrate derived from native *L.m.* B–512 dextran containing an average of 0.5 nitrate group per anhydroglucopyranosidic unit.

*Example IV*

Example II is repeated except that the gel is obtained by adding to the nitromethane 5 parts of dextran nitrate-sulfate derived from native *L.m.* B–512 dextran containing an average of 0.5 nitrate group per A.G.U., and an average of 2.0 sulfate groups per A.G.U.

*Example V*

Example I is repeated except that, before mixing in the nitrodextran, about 1.0% chrome acetyl acetonate is added to the nitromethane as sensitizer.

Other stable thickened fluids or semi-solid to rigid gels may be prepared using other nitroparaffins and other nitrodextrans of D.S. 0.1 to 3.0 and other dextran-nitrate sulfates of total D.S. 0.1 to 3.0, and derived from water-soluble or water-insoluble dextrans in amount of 5% to 15% by weight. Solutions of normally solid organic polynitro-compounds in nitromethane may be thickened, including such solutions of trinitrotoluene, polynitrobenzene, dinitropropane and other higher polynitroparaffins that have enough oxygen in their molecules to sustain self-combustion. The nitroparaffin may be selected to yield propellants meeting standard requirements for hardness, temperature coefficient and freedom from detonation.

The mixtures may be prepared at room temperature without requiring heating so that there is no hazard presented such as exists when propellants are exposed to elevated temperatures.

The thickened or gelled products containing a sensitizer may be formed into sticks like dynamite and, having shattering properties and power similar to that of nitroglycerine, may be used in place of dynamite.

As will be apparent, various changes and modifications may be made in practicing the invention without departing from the spirit and scope thereof. It is to be understood, therefore, that it is not intended to limit the invention except as defined in the appended claims.

What is claimed is:

1. A composition of matter consisting essentially of a nitroparaffin and a dextranate selected from the group consisting of dextran nitrates and dextran nitrate-sulfates, said dextranate being present in an amount of about 5% to 15% by weight of the composition.

2. A composition of matter consisting essentially of a nitroparaffin and a dextranate selected from the group consisting of dextran nitrates and dextran nitrate-sulfates derived from water-soluble dextran, said dextranate being present in an amount of about 5% to 15% by weight of the composition.

3. A composition of matter consisting essentially of a nitroparaffin and a dextranate selected from the group consisting of dextran nitrates and dextran nitrate-sulfates derived from water-insoluble dextran, said dextranate being present in an amount of about 5% to 15% by weight of the composition.

4. A composition of matter consisting essentially of a nitroparaffin and dextran nitrate derived from water-soluble dextran, said dextran nitrate being present in an amount of about 5% to 15% by weight of the composition.

5. A composition of matter consisting essentially of a nitroparaffin and dextran nitrate derived from water-insoluble dextran, said dextran nitrate being present in an amount of about 5% to 15% by weight of the composition.

6. A composition of matter consisting essentially of a nitroparaffin and dextran nitrate-sulfate derived from water-soluble dextran, said dextran nitrate sulfate being present in an amount of about 5% to 15% by weight of the composition.

7. A composition of matter consisting essentially of a nitroparaffin and dextran nitrate-sulfate derived from water-insoluble dextran, said dextran nitrate sulfate being present in an amount of about 5% to 15% by weight of the composition.

8. A gelled or thickened normally liquid composition consisting of a nitroparaffin and as a thickener a dextranate selected from the group consisting of dextran nitrate and dextran nitrate sulfate, said dextranate being present in amount of from 5% to 15% by weight of said composition to produce a thickened or syrupy nitro-paraffin.

References Cited in the file of this patent

UNITED STATES PATENTS

| | | |
|---|---|---|
| 2,039,046 | Wyler | Apr. 28, 1936 |
| 2,551,554 | Wood | May 1, 1951 |
| 2,584,803 | Hannum | Feb. 5, 1952 |
| 2,643,184 | Cairns | June 23, 1953 |
| 2,690,964 | Maisner | Oct. 5, 1954 |
| 2,712,989 | Maisner | July 12, 1955 |